April 16, 1963　　　A. W. MERK　　　3,085,650
ORCHARD PLATFORM
Filed Jan. 26, 1961　　　　　　　4 Sheets-Sheet 2
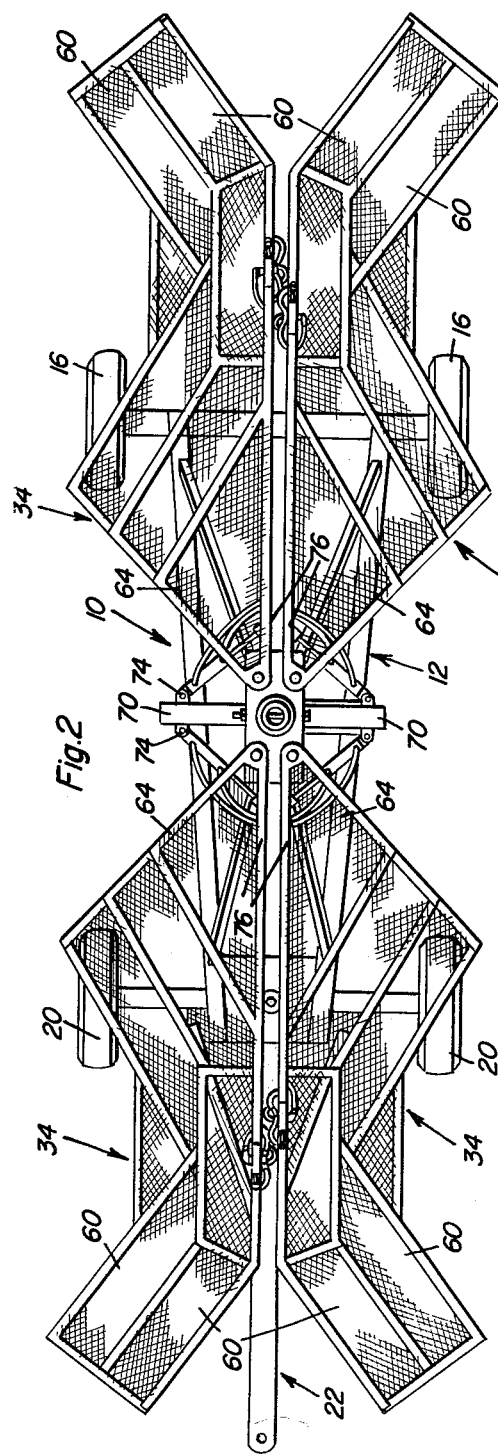
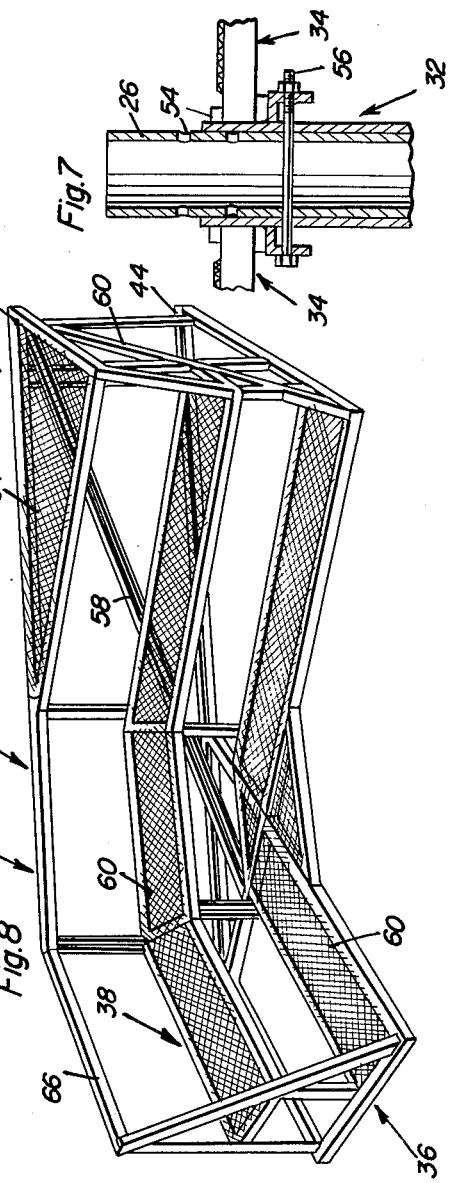
Andrew W. Merk
INVENTOR.
BY *Clarence A. O'Brien*
*and Harvey B. Jacobson*
Attorneys

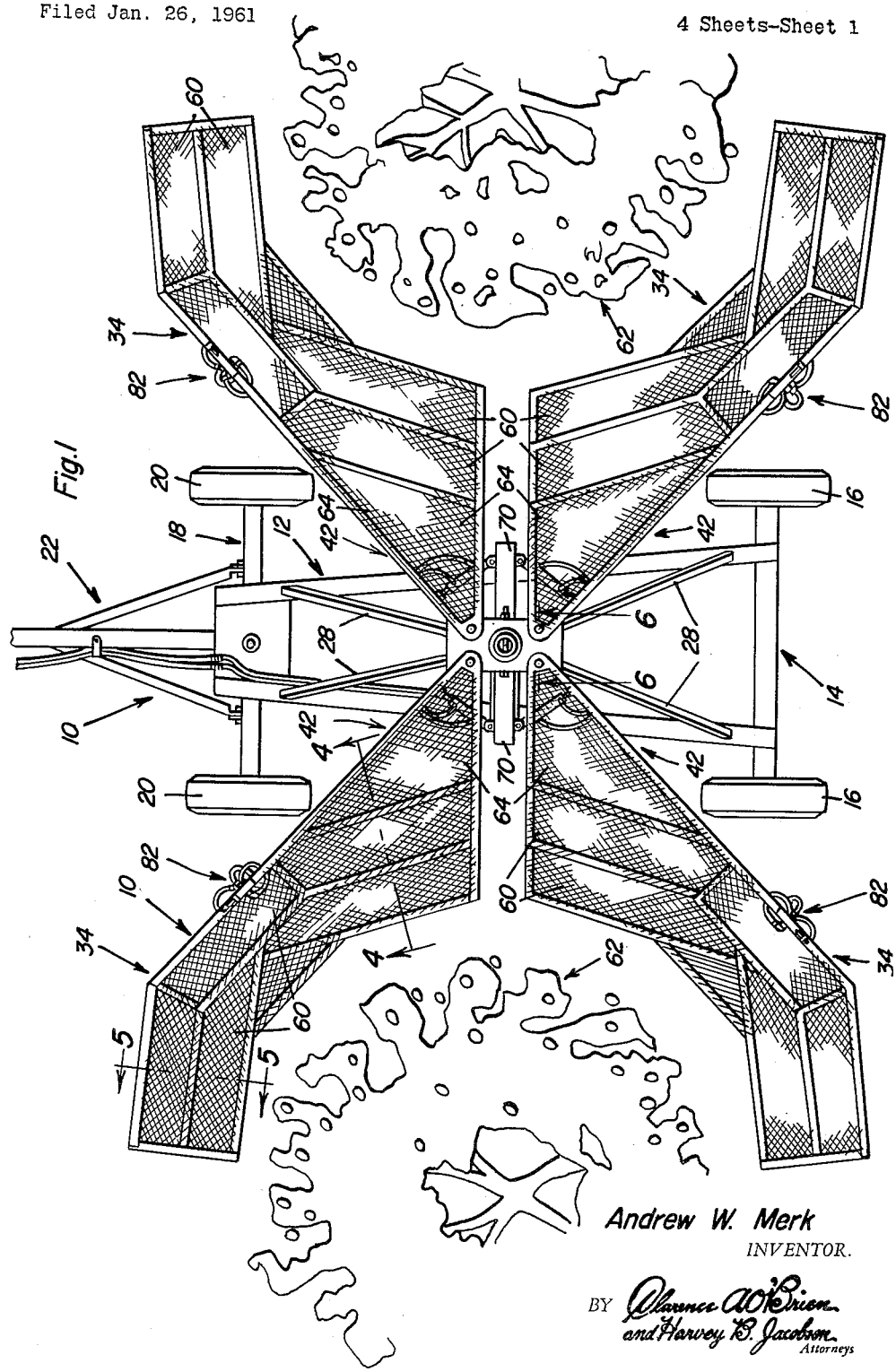

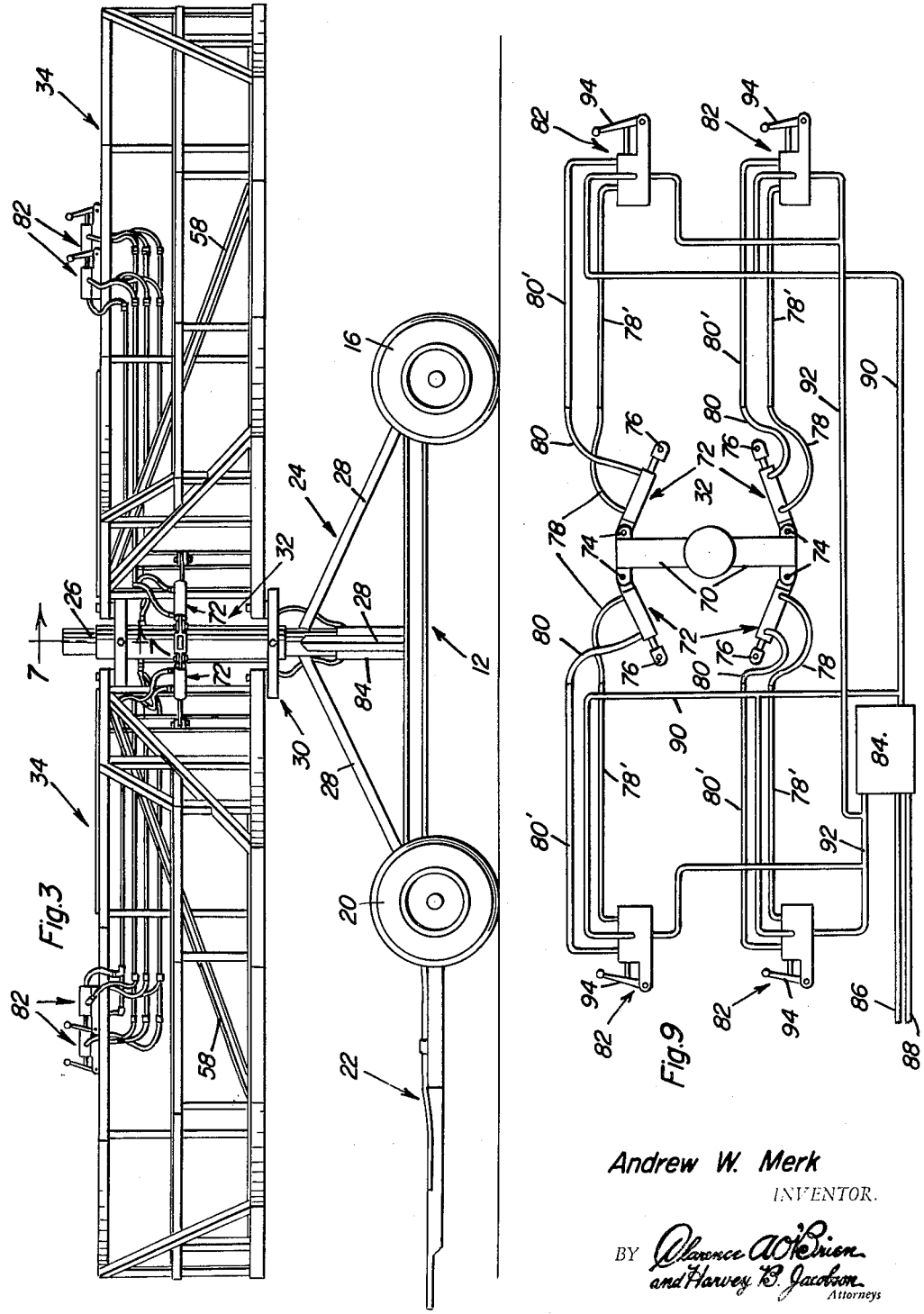

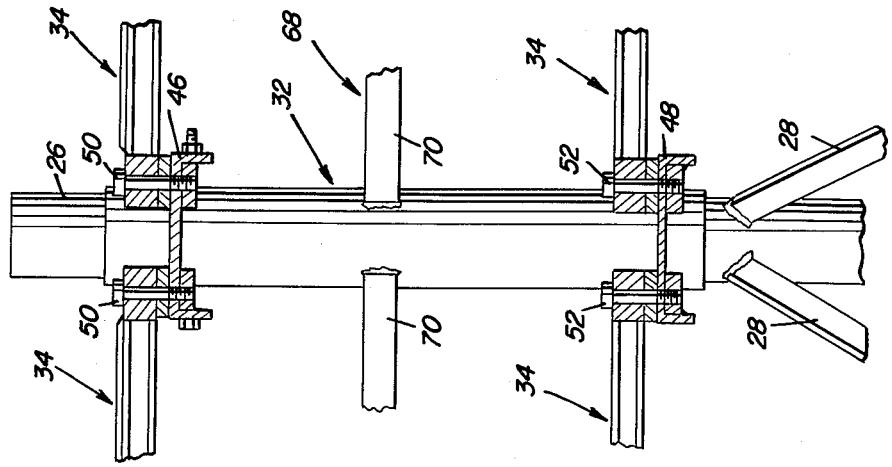
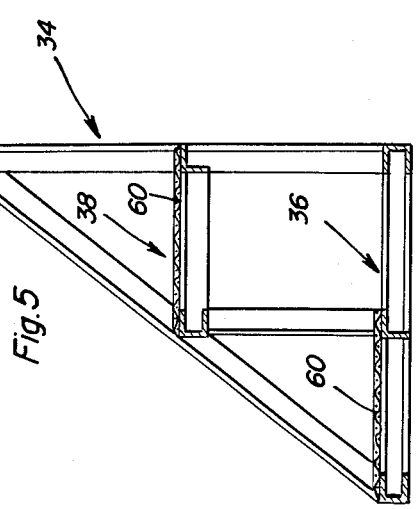
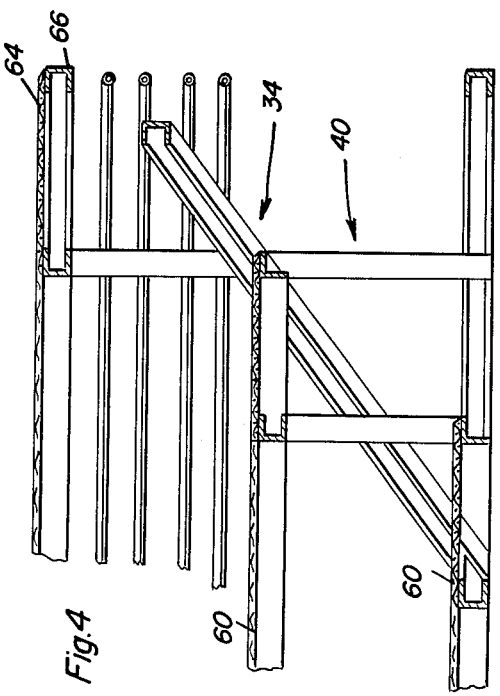

United States Patent Office 3,085,650
Patented Apr. 16, 1963

3,085,650
ORCHARD PLATFORM
Andrew W. Merk, 372 S. Locan Ave., Fresno, Calif.
Filed Jan. 26, 1961, Ser. No. 85,083
9 Claims. (Cl. 182—63)

This invention relates to a novel and useful orchard platform specifically adapted to provide a means whereby fruit pickers or workmen may be supported in elevated positions about an orchard tree from which fruit is to be picked and upon which general orchard operations such as pruning, thinning, and tree-wiring are to be performed.

In the past various types of fruit orchard stands have been designed for supporting the fruit pickers in elevated positions immediately adjacent an orchard tree from which fruit is to be picked. However, these previous attempts at providing an elevated support for fruit pickers have for the most part included the provision of a boom-like structure mounted at one end for universal movement, whereby a fruit picker supported by the other end could be elevated to the desired position adjacent an orchard tree. These boom type of orchard stands also included in some cases telescopically engaged sections whereby the effective overall length of the boom could be adjusted. However, the boom-type of support for a fruit picker has proven not to be as an effective support as is desired, inasmuch as the entire boom assembly has to be moved in order to move the fruit picker from location adjacent the tree to another location adjacent the same tree. A slightly more adaptable type of orchard platform including substantially horizontally disposed walkways have also been provided but these walkways have been substantially straight and while enabling the fruit picker to move tangentially with respect to the outer circumference of the tree, this type of walkway platform also failed to provide a support from which one or more fruit pickers could reach substantially all of the fruit carried by one-half of an orchard tree.

The main object of this invention is to provide an orchard platform which may readily be moved between two rows of orchard trees and which may be intermittently positioned adjacent selected trees and utilized to support one or more fruit pickers in a manner whereby the fruit pickers may have access to substantially one-half of the tree adjacent which the platform is disposed.

A further object of this invention, in accordance with the preceding object, is to provide an orchard platform having means thereon for supporting fruit pickers at various heights relative to the orchard tree from which fruit is being picked.

Another object of this invention is to provide an orchard platform for supporting fruit pickers which includes an elongated support frame having wheel assemblies at opposite ends thereof whereby the support frame may be moved longitudinally between rows of orchard trees.

A still further object of this invention, in accordance with the immediately preceding object, is to provide an orchard platform including at least one pair of arcuate support platforms each being generally quarter-circular in plan outline with the support platforms extending longitudinally of the support frame and being longitudinally aligned with respect thereto and provided with means on the adjacent ends for pivotally mounting each of the platforms to the support frame whereby their remote ends may be swung outwardly of the same side of the support frame. Thus, the arcuate support platforms may be moved from longitudinally extending retracted positions to positions with their remote ends swung outwardly from one side of the support frame. The support platforms are each disposed in their retracted positions so that they open outwardly of and to the same side of the support frame whereby when they are pivoted to their extended positions they will open outwardly of the support frame and toward each other to form a generally semi-circular platform embracing the adjacent half of the orchard tree adjacent which the support frame is disposed. In this manner, the support frame may be moved down between two rows of orchard trees and then back up the next adjacent row between orchard trees whereby each half of the orchard trees may be systematically covered by fruit pickers.

A still further object of this invention in accordance with the immediately preceding object is to provide the support frame with at least two pair of arcuate support platforms whereby the support frame may be disposed between adjacent orchard trees and the support platforms thereof may be actuated to simultaneously embrace the adjacent halves of the two orchard trees whereby the orchard platform may be utilized to position fruit pickers immediately adjacent and half way about two orchard trees at the same time.

An ancillary object of this invention is to provide means for adjustably positioning the support platforms about their axes of rotation which includes means carried by each of the support platforms for individually positioning that support platform relative to the support frame.

Still another object of this invention is to provide a means whereby the support platforms may be adjusted vertically relative to the support frame so that the latter may be utilized to support fruit pickers in advantageous positions immediately adjacent fruit trees of different ages and sizes.

A final object to be specifically enumerated herein is to provide an orchard platform which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the orchard platform shown with the support platforms thereof disposed in extended positions and in positions to embrace the adjacent halves of two orchard trees between which the orchard platform is disposed;

FIGURE 2 is a top plan view of the orchard platform with the support platforms being disposed in their retracted positions whereby the orchard platform may be moved between rows of orchard trees;

FIGURE 3 is a side elevational view of the orchard platform;

FIGURE 4 is an enlarged fragmentary vertical sectional view taken substantially upon the plane indicated by the section line 4—4 of FIGURE 1;

FIGURE 5 is an enlarged vertical sectional view taken substantially upon the plane indicated by section line 5—5 of FIGURE 1;

FIGURE 6 is an enlarged fragmentary vertical sectional view taken substantially upon the plane indicated by the section line 6—6 of FIGURE 1;

FIGURE 7 is an enlarged fragmentary transverse vertical sectional view taken substantially upon the plane indicated by the section line 7—7 of FIGURE 3;

FIGURE 8 is a perspective view of one of the support platforms; and

FIGURE 9 is a schematic view of the hydraulic system and controls therefor for pivoting the support platforms about their axes of rotation.

Referring now more specifically to the drawings the numeral 10 generally designates the orchard platform of the present invention. The orchard platform 10 includes a support frame generally referred to by the reference numeral 12 having a stationary rear axle assembly generally designated by the reference numeral 14 provided with ground engaging wheels 16 and a steerable front axle assembly generally referred to by the reference numeral 18 and provided with ground engaging wheels 20. The front axle assembly 18 includes a draw bar assembly generally referred to by the reference numeral 22 for engagement with a draft vehicle at its outer end.

With attention now directed to FIGURES 1, 3 and 6 of the drawings it will be seen that the support frame includes a standard assembly generally referred to by the reference numeral 24. The standard assembly 24 includes a generally cylindrical upright standard member 26 which is braced by means of radial inclined brace rods 28 secured between the standard member 26 and the support frame 12.

A lift assembly generally referred to by the reference numeral 30 includes a mounting sleeve generally referred to by the reference numeral 32 upon which each of the arcuate support platforms generally referred to by the reference numeral 34 are pivotally mounted.

Each of the support platforms 34 includes a pair of horizontally disposed arcuate supporting frames generally designated by the reference numerals 36 and 38. The supporting frames 36 and 38 comprise a part of the framework assembly generally referred to by the reference numeral 40 which makes up each of the support platforms 34 and includes a laterally projecting mounting portion generally designated by the reference numeral 42 which projects from the convex side of the corresponding support platform and by which that platform 34 is pivotally secured to the lift assembly 30. Each of the mounting portions 42 includes a pair of frame members apertured as at 44, see FIGURE 8. The mounting sleeve 32 includes a pair of horizontal mounting plates 46 and 48 and is slidably disposed on the standard member 26. Each of the support platforms 34 is pivotally secured to the plates 46 and 48 by means of pivot fasteners 50 and 52 secured through the apertures 44 and to the plates 46 and 48 respectively, see FIGURE 6.

With attention now directed to FIGURE 7 of the drawings it will be noted that the standard member 26 is cylindrical and is provided with pairs of diametrically aligned and longitudinally spaced bores 54 and that the mounting sleeve 32 has a mounting bolt 56 secured therethrough and through one pair of the diametrically aligned bores 54 formed in the standard member 26 thus, it will be noted that the mounting sleeve 32 may be adjusted vertically on the standard member 26 by merely removing the bolt 56 and elevating the mounting sleeve to the desired position and then again securing the mounting bolt 56 through the mounting sleeve 32. Alternately, hydraulic means may be used.

Each of the support frames 34 is provided with suitable angle bracing members such as bracing members 58 and 60, see FIGURE 8, for preventing the framework 40 from twisting about a longitudinal axis. The support frames 36 and 38 each includes a supporting surface 60 adapted to support a fruit picker. The support frames 36 are generally arcuate in plan and the lowermost support frame 36 has a smaller inner radius than the upper support frame 38 whereby the supporting surfaces 60 of each support platform 34 are arranged in a manner similar to the seats of the curved end of a stadium or coliseum. With the supporting surfaces of each support platform 34 arranged in this manner one or more fruit pickers supported thereby may readily have access to substantially one quarter of either of the fruit trees generally designated by the reference numeral 62 as can best be seen in FIGURE 1 of the drawings.

With attention now directed to FIGURES 1, 2 and 8 it will be noted that the mounting portion of each support platform 34 also includes a third supporting surface 64 which supporting surface enables fruit pickers supported by either of the support platforms 34 to step readily to another platform 34 when the platforms are disposed either in retracted positions as illustrated in FIGURE 2 of the drawings or extended positions as illustrated in FIGURE 1 of the drawings. In addition, each of the support platforms 34 includes a railing 66 disposed above the upper supporting surface 60 thereof and comprising a portion of the support members for the supporting surface 64 thereof.

With attention now directed to FIGURES 2, 6 and 9 it will be noted that the mounting sleeve 32 also includes a transverse mounting member generally designated by the reference numeral 68 and including two radially extending members 70 secured to the mounting sleeve 32 at their inner ends. The outer end of each of the members 70 has a pair of extensible fluid motor assemblies generally designated by the reference numeral 72 pivotally secured thereto as at 74 in any convenient manner. The other end of each of the extensible fluid motors 72 is pivotally secured to the corresponding support platform 34 as at 76 whereby upon extension and contraction of the extensible fluid motors 72 the support platforms 34 may each be pivoted from between the positions illustrated in FIGURE 1 of the drawings to the positions illustrated in FIGURE 2 of the drawings.

Each of the extensible fluid motors 72 has operatively connected therewith a pair of flexible hydraulic lines 78 and 80 which are communicated with a hydraulic control assembly generally designated by the reference numeral 82 by means of rigid hydraulic lines 78' and 80', respectively. Each of the extensible fluid motors 72 is a double-acting motor and the lines 78 and 78' carry hydraulic fluid under pressure to extend the fluid motors 72 while the lines 80 and 80' carry hydraulic fluid under pressure to contract the fluid motor 72. A hydraulic reservoir 84 is provided which is operatively connected to any suitable hydraulic pump (not shown) by means of return and supply lines 86 and 88 respectively. Each of the control assemblies 82 is connected to the hydraulic reservoir 84 by means of a supply line 90 and a return line 92. Upon actuation of the hydraulic pump (not shown) hydraulic fluid under pressure is supplied to each of the control assemblies 82 by means of the supply lines 90 and the lever 94 of each control assembly 82 may be actuated to route the hydraulic fluid under pressure to either of the sets of hydraulic lines 78 and 78' or 80 and 80' as desired while simultaneously communicating the other of the sets of hydraulic lines with the return pipe 92. Thus, it may be seen that each of the support platforms 34 has its own control assembly 82 for controlling its pivotal movement between the retracted position illustrated in FIGURE 2 and the extended operative position shown in FIGURE 1. The control 82 of each support platform may of course be operated by a fruit picker being supported thereby.

In operation, the wheeled orchard platform 10 may have its draw bar 22 connected to a suitable draft vehicle (not shown) having a hydraulic pump thereon to which return and supply lines 86 and 88 respectively may be connected. While the orchard platform 10 is passing between rows of trees 62, the support platforms 34 are pivoted to their retracted positions illustrated in FIGURE 2 of the drawings with the arcuate platforms opening outwardly toward opposite sides of the support frame 12. As the orchard platform is moved between two trees 62 from which fruit is to be picked the orchard platform 10 is secured in a stationary position either by applying brakes or similar means on the platform itself or by applying the brakes of the draft vehicle. The support platform 34 may then be pivoted to their outwardly extending positions as illustrated in FIGURE 1 of the drawings wherein each pair of platforms 34 will form a semi-circular arrangement of supporting surfaces about substantially one-half of the fruit trees 62. The supporting surfaces 60 and 64 may then be stood on by fruit pickers in order that they may be able to reach all of the fruit on those halves of the trees 62 adjacent the platform 10. After the fruit has been picked from the trees 62, the support platforms 34 are again pivoted to the closed position whereupon the platform 10 may then be moved to a position disposed between another pair of fruit trees. In this manner, all of the fruit may be readily removed from one entire side of each tree of a pair of rows of fruit trees. Of course, if it is desired to raise and lower the support platforms 34 this may be done by elevating or lowering the mounting sleeve 24 on the standard member 26.

The foregoing is considered as illustrative only of the prinicples of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An orchard platform comprising an elongated support frame, at least one pair of arcuate support platforms mounted on each side of said frame with each platform being generally quarter-circular in plan outline, means pivotally mounting each of said platforms to said support frame for swinging movement through the plane in which the corresponding platform is disposed and about an upstanding axis adjacent the longitudinal center line of said frame and spaced laterally outwardly of the convex side of one end of said platform, said pivotal mounting means mounting each pair of said platforms on the corresponding side of said support frame for movement between the retracted longitudinally aligned positions opening outwardly of said corresponding side and in the same direction extending at generally right angles to the longitudinal centerline of said frame and extended positions with the remote ends of the corresponding pair of platforms swung outwardly to the corresponding side of said frame and opening outwardly thereof and toward each other forming a generally semi-circular platform opening in said direction and both said pairs of platforms adapted to embrace substantially the entire adjacent halves of orchard trees in adjacent rows of trees from which fruit is to be picked and between which said frame is disposed with said frame generally following said rows, the pairs of said platforms being aligned transversely of said frame and corresponding ones of said pairs of platforms, when in the retracted positions, having the portions thereof spaced generally equidistance from their ends disposed closely adjacent each other along the longitudinal center line of said frame.

2. The combination of claim 1 including means for adjustably positioning said platforms about their respective axes of rotation.

3. The combination of claim 2 wherein said last mentioned means includes means for adjustably positioning each of said platforms individually.

4. The combination of claim 3 wherein each of said platforms includes control means for controlling the positioning means for that platform.

5. The combination of claim 1 wherein said support frame includes supporting wheel assemblies having wheels journaled for rotation about horizontally disposed axes extending transversely of said support frame.

6. The combination of claim 1 wherein said support frame includes a standard, a lift assembly mounted on said standard for adjustable movement vertically thereof, said mounting means being carried by said lift assembly whereby vertical adjustment of the latter will also simultaneously vertically adjust said support platforms carried thereby.

7. The combination of claim 1 wherein each of said support platforms includes at least two horizontally disposed arcuate supporting surfaces in vertically spaced relation.

8. The combination of claim 7 wherein said supporting surfaces of each support platforms have different inner radii.

9. The combination of claim 8 wherein the lower of any two of said arcuate supporting surfaces on one of said support platforms has a smaller inner radius than the supporting surface disposed immediately thereabove.

References Cited in the file of this patent

UNITED STATES PATENTS

| | | |
|---|---|---|
| 2,337,674 | Miller | Dec. 28, 1943 |
| 2,428,184 | Swindler | Sept. 30, 1947 |
| 2,601,092 | Cardiff | June 17, 1952 |
| 2,614,893 | Merrill | Oct. 21, 1952 |
| 2,749,188 | Mitchell | June 5, 1956 |